(12) United States Patent
Fukazawa

(10) Patent No.: US 11,981,314 B2
(45) Date of Patent: May 14, 2024

(54) VEHICLE CONTROL DEVICE

(71) Applicant: ISUZU MOTORS LIMITED, Tokyo (JP)

(72) Inventor: Shinichiro Fukazawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 297 days.

(21) Appl. No.: 17/763,143

(22) PCT Filed: Sep. 18, 2020

(86) PCT No.: PCT/JP2020/035473
§ 371 (c)(1),
(2) Date: Mar. 23, 2022

(87) PCT Pub. No.: WO2021/060187
PCT Pub. Date: Apr. 1, 2021

(65) Prior Publication Data
US 2022/0348173 A1 Nov. 3, 2022

(30) Foreign Application Priority Data
Sep. 24, 2019 (JP) .................. 2019-173072

(51) Int. Cl.
*B60T 8/172* (2006.01)
*B60T 7/12* (2006.01)
(Continued)

(52) U.S. Cl.
CPC ............... *B60T 8/172* (2013.01); *B60T 7/12* (2013.01); *B60T 8/171* (2013.01); *B60T 8/321* (2013.01);
(Continued)

(58) Field of Classification Search
CPC . B60T 8/172; B60T 7/12; B60T 8/171; B60T 8/321; B60T 2210/20; B60T 2250/02; B60T 2230/02
See application file for complete search history.

(56) References Cited

U.S. PATENT DOCUMENTS

2007/0050110 A1   3/2007 Kondoh et al.
2016/0368497 A1   12/2016 Irie
(Continued)

FOREIGN PATENT DOCUMENTS

CN    106285973 A   1/2017
CN    107709121 A   2/2018
(Continued)

OTHER PUBLICATIONS

Patent Cooperation Treaty, International Search Report, Application No. PCT/JP2020/035473, dated Oct. 16, 2020, in 6 pages.
(Continued)

*Primary Examiner* — Jacob M Amick
(74) *Attorney, Agent, or Firm* — Procopio, Cory, Hargreaves & Savitch LLP

(57) ABSTRACT

A vehicle control device 1 has a prediction unit 122 that predicts a stopping position of a vehicle T, a gradient identification unit 123 that identifies the amount of gradient in the road surface at the stopping position predicted by the prediction unit 122, a weight identification unit 124 that identifies the weight of the vehicle T, and a braking control unit 125 that brakes the vehicle T by changing the pressure of the brakes of the vehicle T at a changing velocity determined on the basis of the amount of gradient identified by the gradient identification unit 123 and the weight of the vehicle T.

4 Claims, 5 Drawing Sheets

(51) Int. Cl.
  *B60T 8/171* (2006.01)
  *B60T 8/32* (2006.01)
(52) U.S. Cl.
  CPC ....... *B60T 2210/20* (2013.01); *B60T 2230/02* (2013.01); *B60T 2250/02* (2013.01)

(56) References Cited

U.S. PATENT DOCUMENTS

| | | | |
|---|---|---|---|
| 2018/0134292 A1 | 5/2018 | Alpman et al. | |
| 2018/0154890 A1 | 6/2018 | Okuda et al. | |
| 2020/0039361 A1* | 2/2020 | Geller | H02P 29/032 |

FOREIGN PATENT DOCUMENTS

| | | |
|---|---|---|
| CN | 108068784 A | 5/2018 |
| CN | 110126810 A | 8/2019 |
| JP | 2004-359147 A | 12/2004 |
| JP | 2005-282453 A | 10/2005 |
| JP | 2007-015602 A | 1/2007 |
| JP | 2007-022376 A | 2/2007 |
| JP | 2007-055410 A | 3/2007 |
| JP | 2008-094246 A | 4/2008 |
| JP | 2015-024789 A | 2/2015 |
| JP | 2015-182572 A | 10/2015 |
| JP | 2015-196403 A | 11/2015 |
| JP | 2016-088146 A | 5/2016 |
| JP | 2018-041264 A | 3/2018 |

OTHER PUBLICATIONS

Patent Cooperation Treaty, WOSA, Application No. PCT/JP2020/035473, dated Oct. 16, 2020, in 3 pages.
National Intellectual Property Administration, Notification of the First Office Action, Application No. CN202080067482.6, dated Jun. 22, 2023, in 15 pages.

* cited by examiner

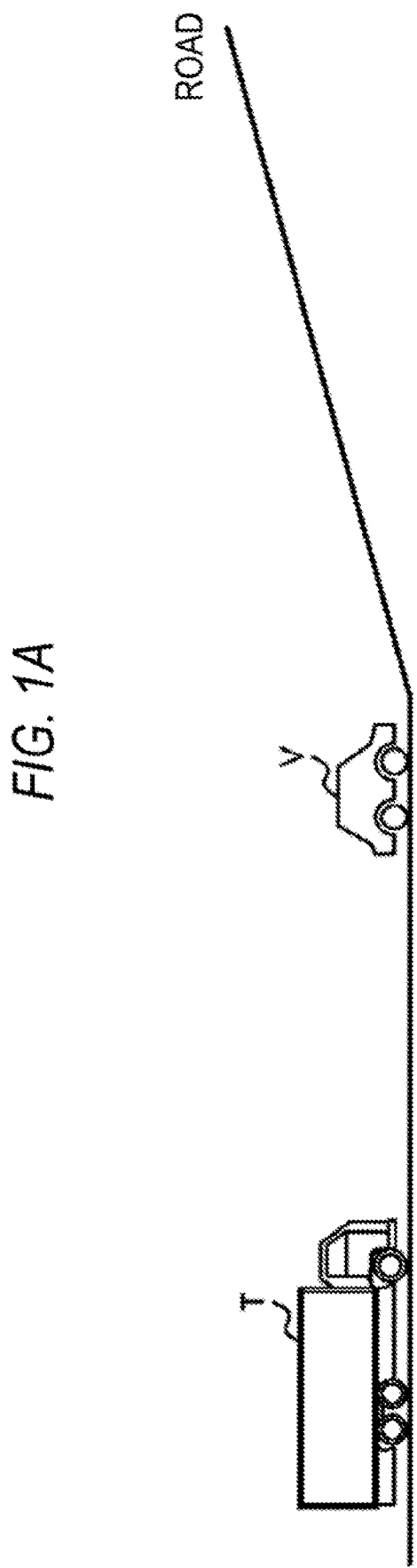

VEHICLE CONTROL DEVICE

CROSS-REFERENCE TO RELATED APPLICATIONS

This application is US National Stage of International Patent Application PCT/JP2020/035473, filed Sep. 18, 2020, which claims benefit of priority from Japanese Patent Application JP2019-173072, filed Sep. 24, 2019, the contents of both of which are incorporated herein by reference.

TECHNICAL FIELD

The present disclosure relates to a vehicle control device for controlling a vehicle.

BACKGROUND ART

A control device that controls braking force reduction in order to reduce shock at a time when a vehicle is stopped, is known. Patent Literature 1 discloses a control device that determines the rate of increase in braking force based on the magnitude of a road surface gradient in order to suppress a vehicle sliding down and reduce the stop shock of the vehicle even in the case of a road surface with a gradient.

CITATION LIST

Patent Literature

Patent Literature 1: JP-A-2008-94246

SUMMARY OF INVENTION

Technical Problem

In the control device of the related art, the rate of increase in braking force is determined based on the magnitude of the gradient of the road surface at the current position of the vehicle. However, the magnitude of the gradient at the travel position of the vehicle at a time when the brake operation is performed is not always the same as the magnitude of the gradient at the position where the vehicle is expected to stop. In such a case, there is a problem that the rate of increase in braking force is not set to an appropriate value.

The present disclosure has been made in view of these points, and an object of the present invention is to provide a vehicle control device capable of reducing shock when a vehicle is stopped.

Solution to Problem

A vehicle control device of the present disclosure includes: a prediction unit that predicts a stop position of a vehicle; a gradient specifying unit that specifies a gradient amount of a road surface at the stop position predicted by the prediction unit; a weight specifying unit that specifies a weight of the vehicle; and a braking control unit that brakes the vehicle by changing a brake pressure of the vehicle at a change speed determined based on the gradient amount specified by the gradient specifying unit and the weight of the vehicle.

The braking control unit increases the change speed as, for example, the gradient amount specified by the gradient specifying unit increases.

The braking control unit may increase the change speed as the weight specified by the weight specifying unit increases.

The gradient specifying unit may specify a plurality of gradient amounts at a plurality of points between the stop position and a current position of the vehicle at a time when the vehicle is detected to stop, and the braking control unit may determine the change speed based on the plurality of gradient amounts.

Advantageous Effects of Invention

According to the present disclosure, a shock can be reduced when a vehicle is stopped.

BRIEF DESCRIPTION OF DRAWINGS

FIG. 1A is a diagram illustrating an overview of a vehicle.

[Overview of Vehicle T]

Figure 1B:
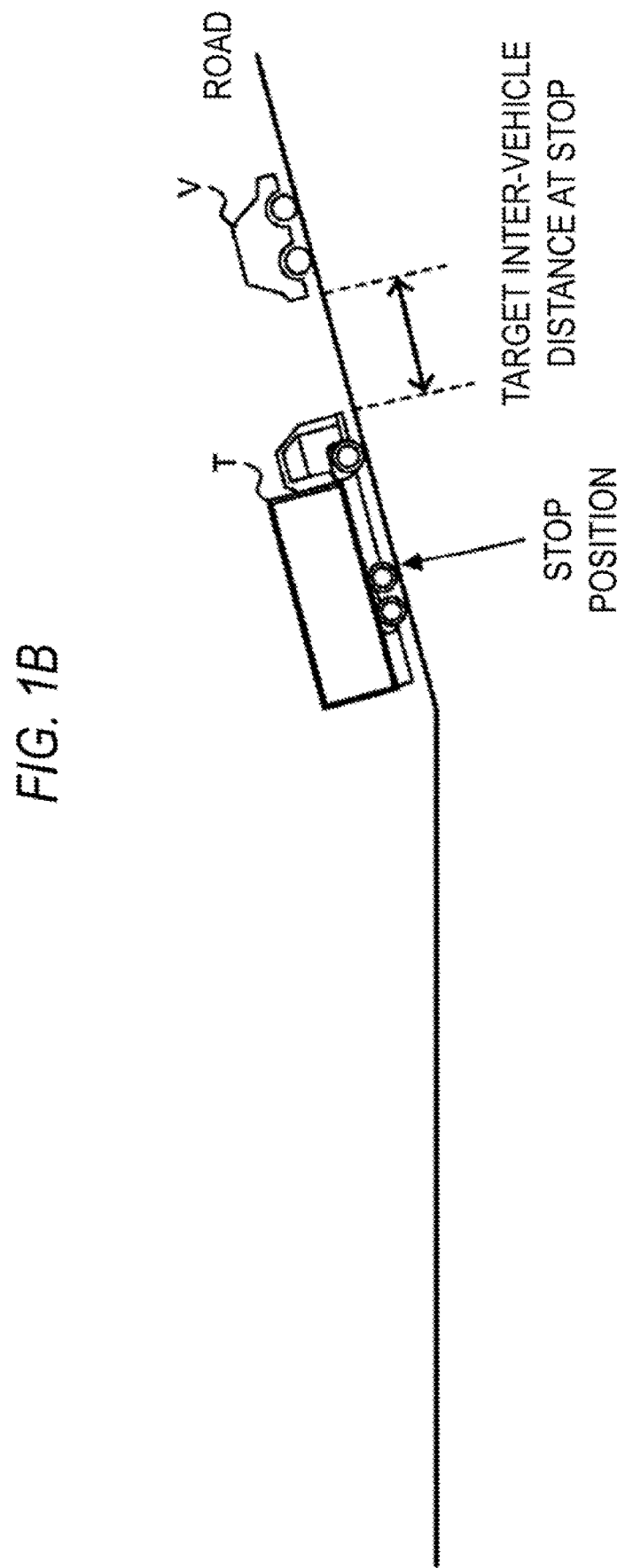
FIG. 1B is a diagram illustrating stop positions of a preceding vehicle V and a vehicle T predicted by the vehicle T.

FIGS. 1A and 1B are a diagram illustrating an overview of a vehicle T according to the present embodiment. FIGS. 1A and 1B are illustrates a state where the vehicle T, which is a commercial vehicle, is traveling behind a preceding vehicle V. The vehicle T has an adaptive cruise control (ACC) function and travels while controlling its own speed to follow the speed of the preceding vehicle V.

It is assumed that the preceding vehicle V has started deceleration in order to stop in the state illustrated in FIG. 1A. The vehicle T detects that the preceding vehicle V stops, and starts deceleration in order to stop. At this time, the vehicle T predicts where to stop.

In order to predict where to stop, the vehicle T first predicts a position of a rear end of the preceding vehicle V at the time when the preceding vehicle V stops, by calculating a distance required for the preceding vehicle V to stop based on the vehicle speed and deceleration of the preceding vehicle V. The vehicle T assumes that a position in front of the predicted position of the rear end of the preceding vehicle V that stops by the target inter-vehicle distance at the stop, is the position of the tip of the vehicle T that stops, and the vehicle T predicts a position of a predetermined part of the vehicle T (e.g. center of gravity) as the stop position, based on the position of the tip of the vehicle T that stops. The vehicle T specifies the road gradient amount at the predicted stop position, by referring to map information including road gradient information. The stop position of the vehicle T is not limited to the position of the center of gravity of the vehicle T that stops and may be the position of another part such as the middle of the vehicle T.

FIG. 1B is a diagram illustrating the stop positions of the preceding vehicle V and the vehicle T predicted by the vehicle T. In the example illustrated in FIG. 1B, the vehicle T is stopped at an upslope position, and the vehicle T specifies the gradient amount at the stop position of the vehicle T illustrated in FIG. 1B.

The vehicle T determines the speed of change in a pressure of a brake (hereinafter, referred to as "brake pressure") immediately before the stop, based on the specified gradient amount and the weight of the vehicle T. Specifically, the vehicle T increases the speed of increase (i.e. rate of increase) in brake pressure as the gradient amount increases. The vehicle T increases the speed of increase in brake pressure as the weight of the vehicle T increases.

By the vehicle T operating in this manner, the speed of change in brake pressure is higher and the brake operates more strongly in a case where there is a gradient at the position where the vehicle T stops and the vehicle T is heavy in weight, than in a case where the position where the vehicle T stops is flat and the vehicle T is light in weight. As a result, the vehicle T can be reliably stopped in a case where there is a gradient at the position where the vehicle T stops and the vehicle T is heavy in weight, and the swing back caused by the brake operation can be reduced in a case where the position where the vehicle T stops is flat and the vehicle T is light in weight. Hereinafter, the configuration and operation of the vehicle T will be described in detail.

[Configuration of Vehicle T]

Figure 2:
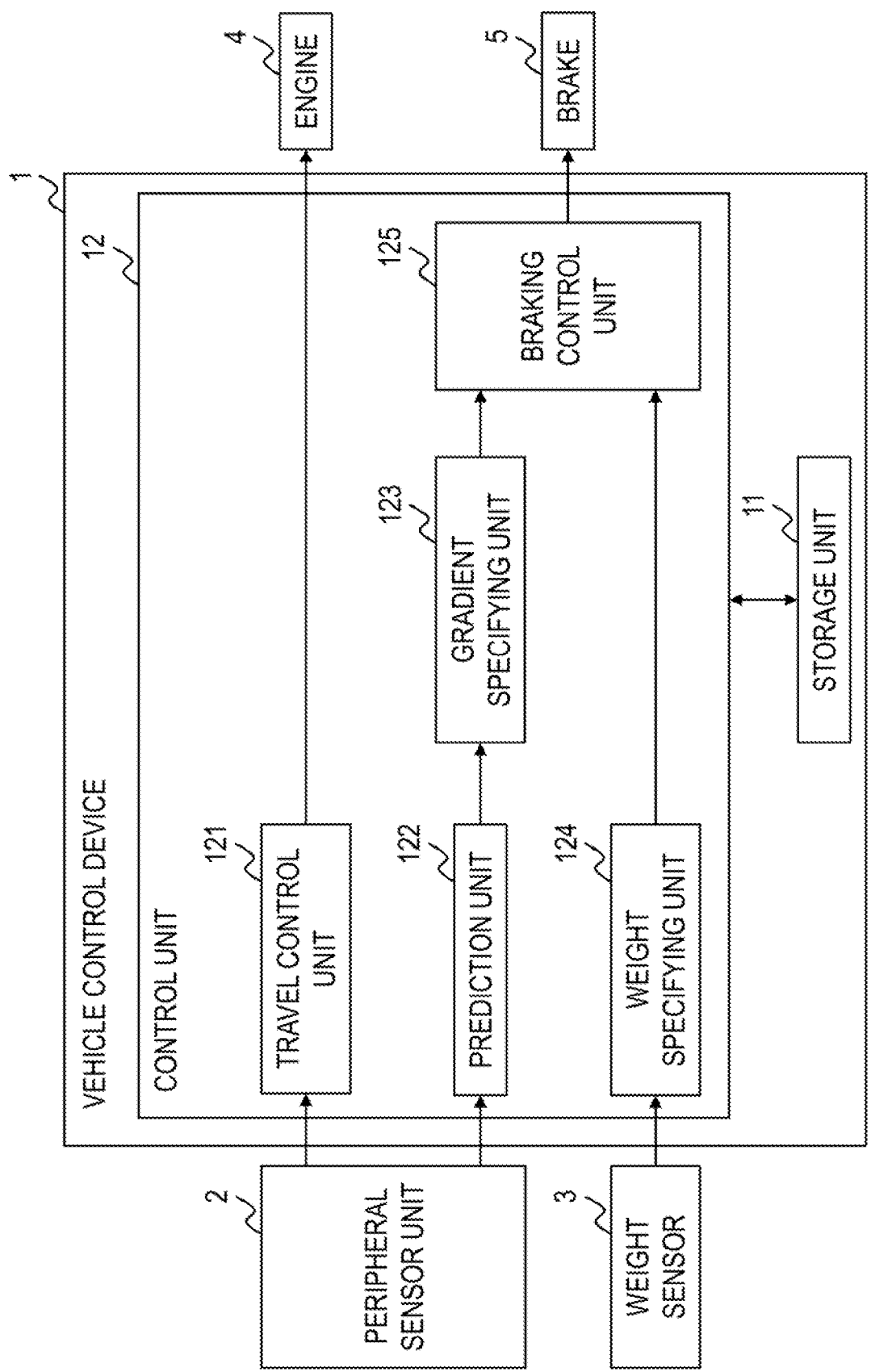
FIG. 2 is a diagram illustrating a configuration of the vehicle T.

FIG. 2 is a diagram illustrating a configuration of the vehicle T. The vehicle T includes a vehicle control device 1, a peripheral sensor unit 2, a weight sensor 3, and an engine 4.

The vehicle control device 1 is a device that controls each part of the vehicle T in order to realize the above operations and is, for example, an electronic control unit (ECU). The vehicle control device 1 includes a storage unit 11 and a control unit 12. The control unit 12 includes a travel control unit 121, a prediction unit 122, a gradient specifying unit 123, a weight specifying unit 124, and a braking control unit 125. The vehicle control device 1 will be described in detail later.

The peripheral sensor unit 2 includes, for example, a radar component or a camera, and detects situations around the vehicle T. The peripheral sensor unit 2 detects, for example, the speed, acceleration, and deceleration of the preceding vehicle V. The peripheral sensor unit 2 may detect other situations such as traffic light, stop line, pedestrian, or obstacle affecting the travel of the vehicle T. The peripheral sensor unit 2 inputs data indicating the detected situation to the travel control unit 121 and the prediction unit 122.

The weight sensor 3 detects the weight of the vehicle T. The weight sensor 3 inputs data indicating the detected weight to the weight specifying unit 124.

[Configuration of Vehicle Control Device 1]

The storage unit 11 includes a storage medium such as a read only memory (ROM) and a random access memory (RAM). The storage unit 11 stores, for example, a program executed by the control unit 12. The storage unit 11 may temporarily store various data input from the peripheral sensor unit 2 and the weight sensor 3. In addition, the storage unit 11 stores, for example, relationship data such as a look-up table in which a plurality of gradient amounts and the speed of change in brake pressure are associated with each other. The storage unit 11 may store the speed of change in brake pressure corresponding to each of the weights of a plurality of the vehicles T. The storage unit 11 may store the speed of change in brake pressure corresponding to each of a plurality of combinations of the gradient amount and the weight of the vehicle T.

The control unit 12 includes, for example, a central processing unit (CPU). The control unit 12 functions as the travel control unit 121, the prediction unit 122, the gradient specifying unit 123, the weight specifying unit 124, and the braking control unit 125, by executing the program stored in the storage unit 11.

The travel control unit 121 controls the vehicle speed of the vehicle T by controlling the engine 4. The travel control unit 121 determines a target vehicle speed of the vehicle T, based on, for example, the speed, acceleration, and deceleration of the preceding vehicle V notified from the peripheral sensor unit 2, and controls the engine 4 such that the vehicle T travels at the target vehicle speed. The travel control unit 121 may determine the target vehicle speed based further on information indicating an external situation other than the speed, acceleration, and deceleration of the preceding vehicle V. The travel control unit 121 determines the target vehicle speed such that, in a case where the traffic light, stop line, pedestrian, obstacle, or the like is detected by the peripheral sensor unit 2, the vehicle T stop at a position in front of a traffic light, stop line, pedestrian, obstacle, or the like.

The prediction unit 122 predicts the stop position of the vehicle T. The prediction unit 122 predicts the stop position of the preceding vehicle V based on, for example, the speed, acceleration, and deceleration of the preceding vehicle V notified from the peripheral sensor unit 2, and predicts the stop position of the vehicle T by specifying the position in front of the predicted stop position of the preceding vehicle V by the target inter-vehicle distance at the stop. In a case where a traffic light, stop line, pedestrian, obstacle, or the like is detected by the peripheral sensor unit 2, the prediction unit 122 may predict a position in front of the traffic light, stop line, pedestrian, obstacle, or the like as the stop position.

The gradient specifying unit 123 specifies the gradient amount of the road surface at the stop position predicted by the prediction unit 122. The gradient specifying unit 123 specifies the gradient amount at the predicted stop position, by referring to, for example, the map information stored in the storage unit 11 and including the road gradient information. The gradient specifying unit 123 may specify the gradient amount at the predicted stop position based on the surrounding situation data input from the peripheral sensor unit 2. The gradient specifying unit 123 notifies the braking control unit 125 of the specified gradient amount.

The weight specifying unit 124 specifies the weight of the vehicle T based on the data input from the weight sensor 3. The weight specifying unit 124 notifies the braking control unit 125 of the specified weight.

The braking control unit 125 brakes the vehicle T by controlling a brake 5. When the vehicle T stops, the braking control unit 125 brakes the vehicle T by changing the pressure of the brake 5 at the change speed determined based on the gradient amount specified by the gradient specifying unit 123. The braking control unit 125 may increase the speed of change in brake pressure as the weight specified by the weight specifying unit 124 increases. The braking control unit 125 may brake the vehicle T by changing the pressure of the brake 5 at the change speed determined based on the gradient amount specified by the gradient specifying unit 123 and the weight of the vehicle T specified by the weight specifying unit 124.

Figure 3:
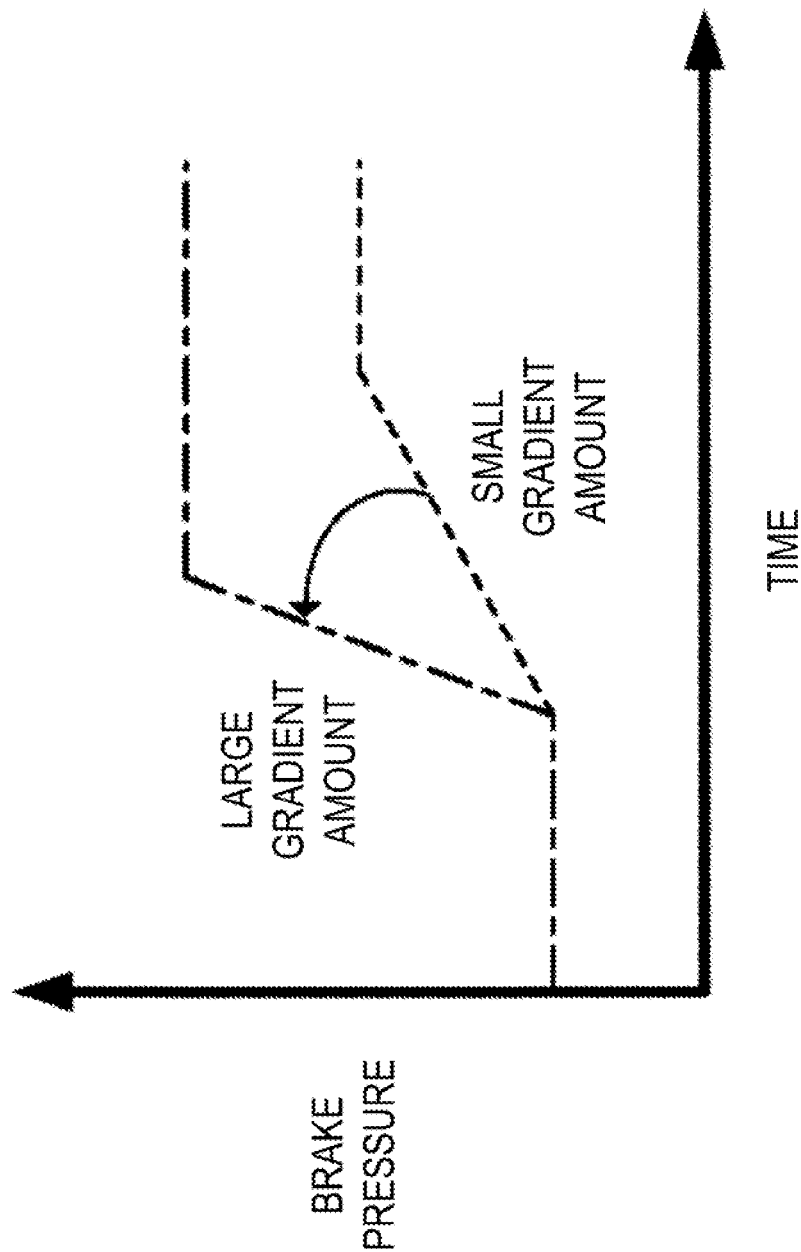
FIG. 3 is a diagram illustrating an operation of a braking control unit 125.

FIG. 3 is a diagram illustrating the operation of the braking control unit 125. The horizontal axis of FIG. 3 indicates time, and the vertical axis of FIG. 3 indicates the brake pressure. The broken line in FIG. 3 indicates how the brake pressure changes at a first gradient amount, and the dashed-and-dotted line in FIG. 3 indicates how the brake pressure changes at a second gradient amount, which is larger than the first gradient amount.

The braking control unit 125 increases the speed of brake pressure change as the gradient amount specified by the gradient specifying unit 123 increases, by referring to, for example, the relationship data indicating the relationship between the gradient amount stored in the storage unit 11 and the brake pressure change speed as illustrated in FIG. 3.

For example, the braking control unit 125 increases the brake pressure change speed as the absolute value of the gradient amount increases. The braking control unit 125 may increase the brake pressure change speed as the weight of the vehicle T increases. By the braking control unit 125 operating in this manner, it is possible to reduce swing back while stopping the vehicle T at an appropriate position on a road with a gradient.

In addition, the braking control unit 125 may change the brake pressure at a speed of change corresponding to the combination of the absolute value of the gradient amount and the weight of the vehicle T. For example, the braking control unit 125 increases the brake pressure change speed as the value obtained by multiply or add the gradient amount and the weight increases. The braking control unit 125 may give different weights to the gradient amount and the weight during multiplication or addition of the gradient amount and the weight, based on an instruction input from the outside. By the braking control unit 125 operating in this manner, the brake pressure can be changed at, for example, a speed of change corresponding to a driver's preference.

[Operation Flowchart of Vehicle Control Device 1]

Figure 4:
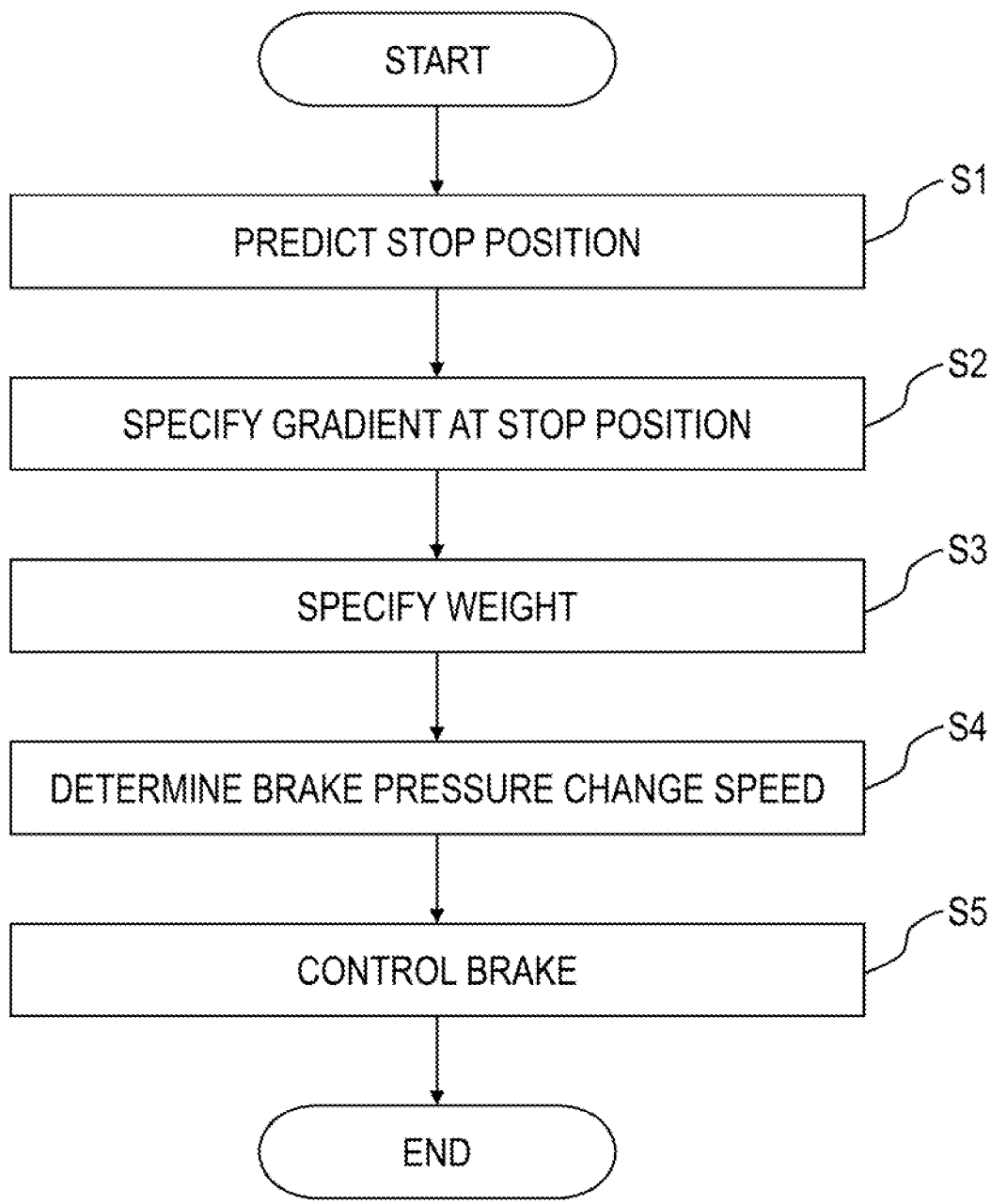
FIG. 4 is an operation flowchart of a vehicle control device 1.

FIG. 4 is an operation flowchart of the vehicle control device 1. The operation flowchart in FIG. 4 starts when the stop position of the vehicle T is predicted by the prediction unit 122 (Step S1). When the stop position is predicted by the prediction unit 122, the gradient specifying unit 123 specifies the gradient amount at the predicted stop position (Step S2). In addition, the weight specifying unit 124 specifies the weight of the vehicle T (Step S3). Any order is applicable to the processing in Step S2 and the processing in Step S3.

Subsequently, the braking control unit 125 determines the brake pressure change speed based on the gradient amount specified in Step S2 and the weight specified in Step S3 (Step S4). The braking control unit 125 stops the vehicle T by operating the brake 5 by changing the brake pressure at the determined speed of change.

MODIFICATION EXAMPLE

Exemplified in the above description is a case where the brake pressure change speed is determined based on the road gradient amount at the position where the vehicle T is scheduled to stop. In the vehicle T, the gradient specifying unit 123 may specify a plurality of gradient amounts at a plurality of points between a predicted stop position and the current position of the vehicle T at a time when the vehicle T or the preceding vehicle V is detected to stop, and the braking control unit 125 may determine the speed of change in the brake pressure based on the plurality of gradient amounts specified by the gradient specifying unit 123.

The gradient specifying unit 123 specifies, for example, a plurality of gradient amounts in a predetermined range in front of and behind a predicted stop position, and the braking control unit 125 determines the speed of change in the brake pressure based on the average value of the specified gradient amounts. The predetermined range is determined based on, for example, accuracy of the predicted stop position prediction performed by the prediction unit 122, and is from the position closest to the current position to the position farthest from the current position among a range where the vehicle T is predicted to stop. The braking control unit 125 may determine the change speed, based on the average value of the plurality of gradient amounts. In the calculation of the average value, a gradient amount at the position close to the predicted stop position weight more than a gradient amount at the position far from the predicted stop position. By the gradient specifying unit 123 and the braking control unit 125 operating in this manner, it is possible to reduce effects of an error of the prediction performed by the prediction unit 122.

[Effect of Vehicle Control Device 1]

As described above, in the vehicle control device 1, the prediction unit 122 predicts the stop position of the vehicle T, and the braking control unit 125 determines the speed of change in the brake pressure at a time when the vehicle T is stopped based on the gradient amount at the predicted stop position and the weight of the vehicle T. By the vehicle control device 1 operating in this manner, the vehicle T can be reliably stopped in a case where the gradient amount is large or in a case where the vehicle T is heavy in weight, and it is possible to reduce the swing back in a case where the gradient amount is small and the vehicle T is light in weight.

Although the present disclosure has been described above using an embodiment, the technical scope of the present disclosure is not limited to the scope described in the above embodiment and various modifications and changes can be made within the scope of the gist thereof. For example, all or a part of the device can be functionally or physically distributed or integrated in any unit. Also new embodiments resulting from any combination of a plurality of embodiments are included in the embodiment of the present disclosure. The effects of the new embodiment resulting from the combination include the effects of the original embodiment.

This application is based on a Japanese patent application filed on Sep. 24, 2019 (Japanese Patent Application No. 2019-173072), the contents of which are incorporated herein by reference.

INDUSTRIAL APPLICABILITY

The present disclosure is useful in that it is possible to provide a vehicle control device capable of reducing a shock when a vehicle is stopped.

REFERENCE SIGNS LIST 1 vehicle control device
2 peripheral sensor unit
3 weight sensor
4 engine
5 brake
11 storage unit
12 control unit
121 travel control unit
122 prediction unit
123 gradient specifying unit
124 weight specifying unit
125 braking control unit

The invention claimed is:
1. A vehicle control device comprising:
a prediction unit that predicts a stop position of a vehicle;
a gradient specifying unit that specifies a gradient amount of a road surface at the stop position predicted by the prediction unit;
a weight specifying unit that specifies a weight of the vehicle; and
a braking control unit that brakes the vehicle by changing a brake pressure of the vehicle at a change speed determined based on the gradient amount specified by the gradient specifying unit and the weight of the vehicle.

2. The vehicle control device according to claim 1,
wherein the braking control unit increases the change speed as the gradient amount specified by the gradient specifying unit increases.

3. The vehicle control device according to claim 1,
wherein the braking control unit increases the change speed as the weight specified by the weight specifying unit increases.

4. The vehicle control device according to claim 1,
wherein the gradient specifying unit specifies a plurality of gradient amounts at a plurality of points between the stop position and a current position of the vehicle at a time when the vehicle is detected to stop, and
the braking control unit determines the change speed based on the plurality of gradient amounts.

* * * * *